United States Patent [19]
Trezek

[11] Patent Number: 5,476,994
[45] Date of Patent: Dec. 19, 1995

[54] METHOD FOR EXTRACTING METALS FROM SEDIMENT

[75] Inventor: George J. Trezek, Danville, Calif.

[73] Assignee: Greenfield Environmental, San Diego, Calif.

[21] Appl. No.: 239,303

[22] Filed: May 6, 1994

[51] Int. Cl.$^6$ .................... A62D 3/00; B09B 3/00
[52] U.S. Cl. .................. 588/256; 209/17; 588/249; 405/128
[58] Field of Search .................. 588/256, 249; 405/128, 129; 210/751, 747; 209/13, 17, 158, 715

[56] References Cited

U.S. PATENT DOCUMENTS

| | | | |
|---|---|---|---|
| 2,330,479 | 9/1943 | Erickson | 209/13 X |
| 2,968,524 | 1/1961 | Seeton | 209/13 X |
| 3,720,380 | 3/1973 | Marsh | 241/24 X |
| 4,076,614 | 2/1978 | Todd | 209/13 |
| 4,217,207 | 8/1980 | Liller | 209/13 |
| 4,529,506 | 7/1985 | Smit | 209/13 |
| 5,024,770 | 6/1991 | Boyd et al. | 405/129 X |
| 5,169,004 | 12/1992 | Pos | 209/17 |

OTHER PUBLICATIONS

Soils Magazine–Mar. 1994 by Greenfield Environmental.

Primary Examiner—Dennis L. Taylor
Attorney, Agent, or Firm—Brown, Martin, Haller & McClain

[57] ABSTRACT

The process for removal of metal-contaminated sediment includes dredging the sediment and removing large objects from the sediment, then removing smaller objects such as shell fragments with a first course screen. The remaining sediment slurry is processed through at least two screens covering a range of mesh sizes to separate the solids into three size/mesh fractions. Water extracted during the separation is processed through a series of hydrocyclones to separate any remaining solids and to allow the water to be recycled. The largest fraction of solids, the "sand fraction" has a low concentration of the metal and requires no further processing. The smallest fraction, which has passed through a mesh corresponding to the size of the most basic form of the metal ore, enters a screw classifier for dewatering after which it is appropriate for direct smelter recycling. The mid-size fraction, while still containing elevated levels of the metal which make it unsuitable for land-based use, does not contain sufficient concentrations for direct smelter recycling. This fraction is passed through a chemical extraction system to create a soluble metal salt from which a precipitate is formed which is then suitable for smelting.

19 Claims, 4 Drawing Sheets

METHOD FOR EXTRACTING METALS FROM SEDIMENT

BACKGROUND OF THE INVENTION

Coastal cities and cities which are located on river banks are commonly afflicted with severe and sometimes dangerous concentrations of heavy metals, including copper, iron and lead in the sediments of the adjacent water bodies. These metals often have deleterious effects on the local population of fish and other aquatic life, resulting in death, malformation or failure to reproduce. In areas where people fish or harvest other types of sea life for food, the high concentrations of metals in the animals' bodies is passed on to the individuals who consume them, endangering their health.

In some cases, the metal contaminants are introduced during the transfer of metal ore between transport vessels and a loading dock. In other instances, contaminants have been released during a variety of vessel maintenance activities, including, among others, metal refinishing or cleansing. Thus, the metal contaminants can have a particularly high concentration within a relatively limited area, creating a "hot spot". Because of tidal activities, these hot spots can diffuse over wide areas, resulting in decreasing contamination gradients over these zones.

The typical procedure for mitigating these above-background concentration areas is to dredge the contaminated area, removing the sediment to a landfill or other disposal site. This increases the burden on the limited available landfill space, and, even more importantly, does not address the long term issue of toxicity. Instead, it merely shifts the contaminant to an area where it may cause less environmental harm on a short term basis. In the alternative, the entirety of the dredged material can be chemically treated to remove the contaminant. While effective at removing the contaminant, this process is prohibitively time consuming and expensive. As is often the case, the economic issues are the determining factor and, until now, there has been no process available which could satisfy both the economic and ecological issues involved in removal of metal contaminants from sediment in bays, harbors, lakes and rivers.

BRIEF SUMMARY OF THE INVENTION

It is an advantage of the present invention to provide a process for extracting metal contaminants from sediment which can concentrate the extracted metal for recycling.

In an exemplary embodiment, the high concentration metal-contaminated zones are dredged to remove the contaminated sediment which is then transferred to a processing site. Large objects are removed from the sediment, then water is added to the dilute solids content. A first screen removes smaller objects such as rocks and shell fragments. The remaining sediment slurry is processed through at least two screens covering a range of mesh sizes to divide the solids into different size ranges. A series of hydrocyclones is used to separate the liquid fraction of the sediment slurry. The liquid is recycled back to a tank which contains water for initial dilution. The remaining solids are separated into three size/mesh fractions. The largest fraction, the "sand fraction" has an nondetectable or low concentration of the metal and requires no further processing. The smallest fraction, which has passed through a mesh corresponding to the size of the most basic form of the metal ore, enters a screw classifier for dewatering after which it is appropriate for direct smelter recycling. The mid-size fraction, while still containing elevated levels of the metal which make it unsuitable for land-based use, does not contain sufficient concentrations for direct smelter recycling. This fraction is passed through a chemical extraction system to create a soluble metal salt from which a precipitate is formed which is then suitable for smelting.

The chemical extraction process consists of adding an acid in which the metal is soluble to the mid-size fraction, then heating and stirring the mixture. After a sufficient reaction time, the solids are allowed to settle and the supernatant liquid is drawn off into a precipitator tank. The solids are washed with recycled water from the precipitating process, after which the slurried solids are dewatered using a screen corresponding to the most basic form of the metal. The remaining acid is neutralized by addition of an appropriate base.

The reactants in the precipitator tank are neutralized with an appropriate base. The liquid is removed and the remaining slurry is dried to provide additional recyclable metal ore. Gaseous materials generated during the reaction are scrubbed to remove toxic components from the discharge.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF THE PREFERRED EMBODIMENT

The process of the present invention is divided into two broad operations: the physical or mechanical separation and the chemical extraction. Within each of these broad operations is a number of steps which are designed to optimize the metal concentration in the end product by separating the metal from the sediment. The following description is of a process for removal of copper from sediment dredged from a former commercial loading site which became contaminated during the loading of copper ore, commonly known as chalcopyrite. It should be noted that, with adjustment for the unique properties and reactivities of a given metal, the inventive process can be adapted for use with a number of different metals and is not limited to extraction of copper.

Figure 1:
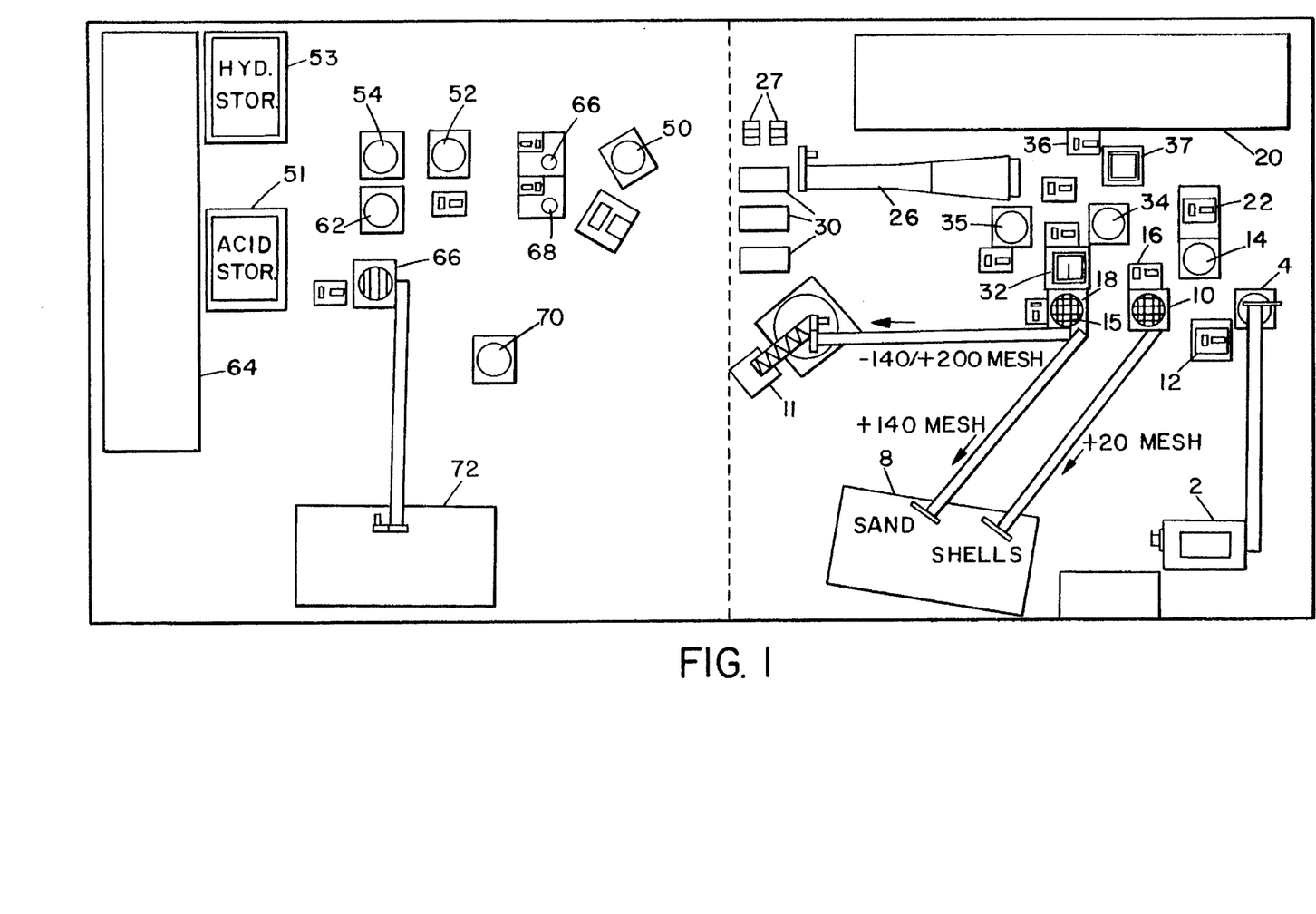
FIG. 1 is a diagrammatic view of the layout of the system for performing inventive process.

The physical layout of the system for performing the inventive process is illustrated in FIG. 1. This pilot project was constructed on the shoreline of San Diego Bay, near the contamination site. The components of the physical separation system are illustrated on the right side of the layout, with the process steps shown in the box diagram of FIG. 2. The components of the chemical extraction process are shown on the left side of FIG. 1, with the detailed process steps shown in FIG. 3. Note that the interconnecting pipes and conduits are not shown between the different processing stations shown in FIG. 1 due to the extensive amount of crossing that is necessary. The process sequence is clearly shown in FIGS. 2 and 3.

Testing of the sediment was conducted to locate the high copper concentration areas so as to identify where dredging should occur. These tests were conducted as is known in the art. The contaminated sediment was dredged and placed in barges which were off-loaded to the treatment site where physical separation was initiated.

Figure 2:
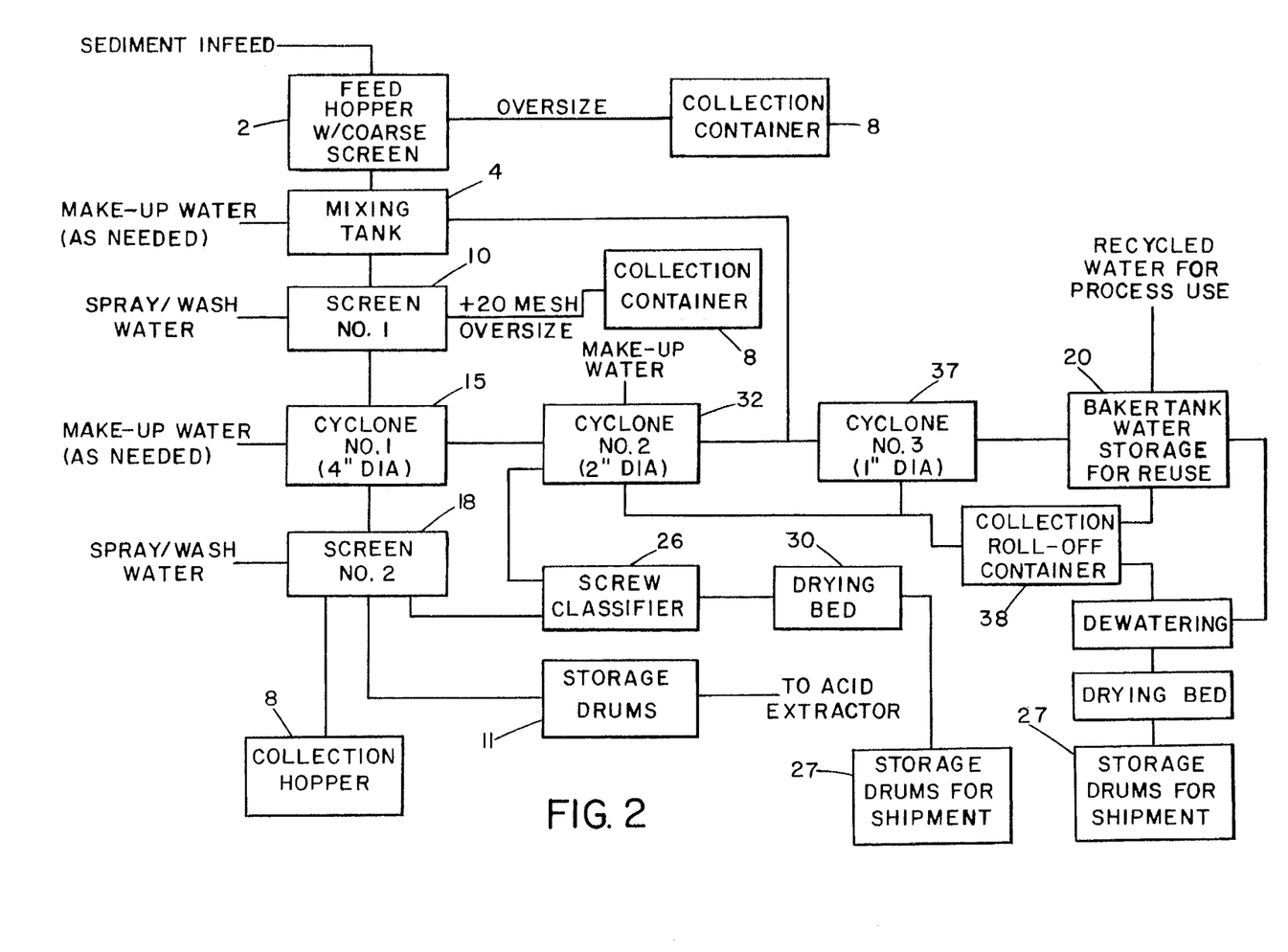
FIG. 2 is a block diagram of the physical separation phase of the process of the present invention.

In the physical separation portion of the inventive process, the sediments are cast into four distinct size fractions. Initially, the sludge or cake-like nature of the dredged sediment material requires that the solids content be reduced to about ten percent before they can be separated into their respective fractions. To accomplish this, water, which is recycled from later process steps, is used to dilute the solids in the initial dilution or mixing tank 4.

Large oversize material such as rocks, ship parts, cable, and other refuse is removed by a screening mechanism contiguous to the feed hopper 2 prior to the material actually entering the process line. Once the sediments are placed into the process line, the first step of the mechanical separation is the removal of the shell fraction which is in the +20 mesh size range. The sediment slurry then proceeds through a series of screens and hydrocyclones where the liquid fraction is recycled back to the initial dilution tank 4 and the solids are separated into three size fractions. After separation, the −20 to +140 mesh fraction, commonly called the "sand fraction", is in compliance with the land-based standard for copper (below 2500 ppm) and requires no further processing. Typically, the copper concentration of the material in the range between −140 and +200 mesh exceeds 2500 ppm, but is not of high enough value for direct smelter recycling and, as a result, continues to be processed through the second stage of the process. The material fraction which is less than 200 mesh has a high copper content suitable for recycling. This fine fraction enters a screw classifier 12 where it is dewatered and removed and dried for direct smelter recycling.

The details of the physical or mechanical separation portion of the process for extracting copper were as follows: The feed hopper 2 was a rectangular tapered bin mounted above a feed augur 6. At the base of the bin above the augur was a course, nominal one inch screen through which the solids were pressed. The large oversize material was transferred to a collection box 8 and the screened solids were conveyed by means of the augur 6 into the mixing tank 4.

The mixing tank 4 was a 250 gallon round vessel equipped with a 290 rpm high volume stirrer. In the mixing tank the sediment was diluted to approximately 15% solids using recycled water from the make-up water tank 20. Mixing tank 4 also served as a feed tank for first screen 10. The diluted sediment was fed into first screen 10 by means of a high volume centrifugal pump 12.

The first screen 10 consisted of a single layer 20 mesh grating on a vibrating base. This screen was designed to remove shells and other slightly oversize debris ("small oversize"). The diluted sediment was directed into the center of the screen surface and washed with an atomized water stream to facilitate separation. The small oversize material was place in a collection container 8 and stored. The −20 mesh material was pumped to the first cyclone mix tank 14 by pump 16. After further mixing with make-up water, if necessary, the −20 mesh material is pumped to first cyclone 15.

The first cyclone 15 consisted of a 4" hydrocyclone designed to dewater the infeed solids for subsequent mechanical separation. Hydrocyclones are known in the art and are commercially available. The unders fraction was channeled onto second screen 18. The overs fraction was pumped by pump 22 into a mixing tank 34 for second cyclone 32.

The second screen 18 was composed of a rotary vibrating base fitted with two screens. The top screen was a 140 mesh grating while the bottom screen was a 200 mesh grating. The +140 mesh material, the "sand fraction", was removed from the screen and placed in a collection roll-off container 8. The −140/+200 mesh fraction, the "midsize fraction", set aside in storage drums 11, was for channeling to the chemical extraction section of the project and the −200 mesh fraction, the "fine fraction", was pumped into the screw classifier 26.

The screw classifier 26 consisted of a settling tank fitted with an inclined augur which served to dewater the −200 mesh fraction. Screw classifiers are known in the art and are commercially available. This fraction, which represented the bulk of the recovered copper ore, was then placed on drying beds 30. After drying, the copper ore was placed in storage drums 27 for shipment to the smelter. The extracted water was directed to the second cyclone 32.

Second cyclone 32, a 2 inch diameter cyclone, was connected to a mix tank 34 which contained the overs fraction from the first cyclone 15 and the extracted water from the screw classifier 26. The principal aim of cyclone 32 was to separate fine copper contaminated solids from the process water. The unders fraction was transferred into another mixing tank 35 before being pumped through the third cyclone 37.

The third cyclone 37, with a 1 inch diameter, was used primarily for dewatering the remaining solids so that the process water could be recycled to the main mixing tank 4. The unders fraction was channeled to the collection roll-off container 38 and the overs fraction was pumped to a holding tank 20 by pump 36.

The unders sent to the collection roll-off container 38 were allowed to settle, then dewatered and sent to the drying beds 30 after which the ore was placed in storage drums 29 for shipment.

The holding tank 20 was a Baker tank consisting of a 21,000 gallon rectangular holding tank fitted with a 200 gallon per minute transfer pump. Tank 20 was used to hold water clarified which was recycled to the front end of the process as make-up water.

Figure 3:
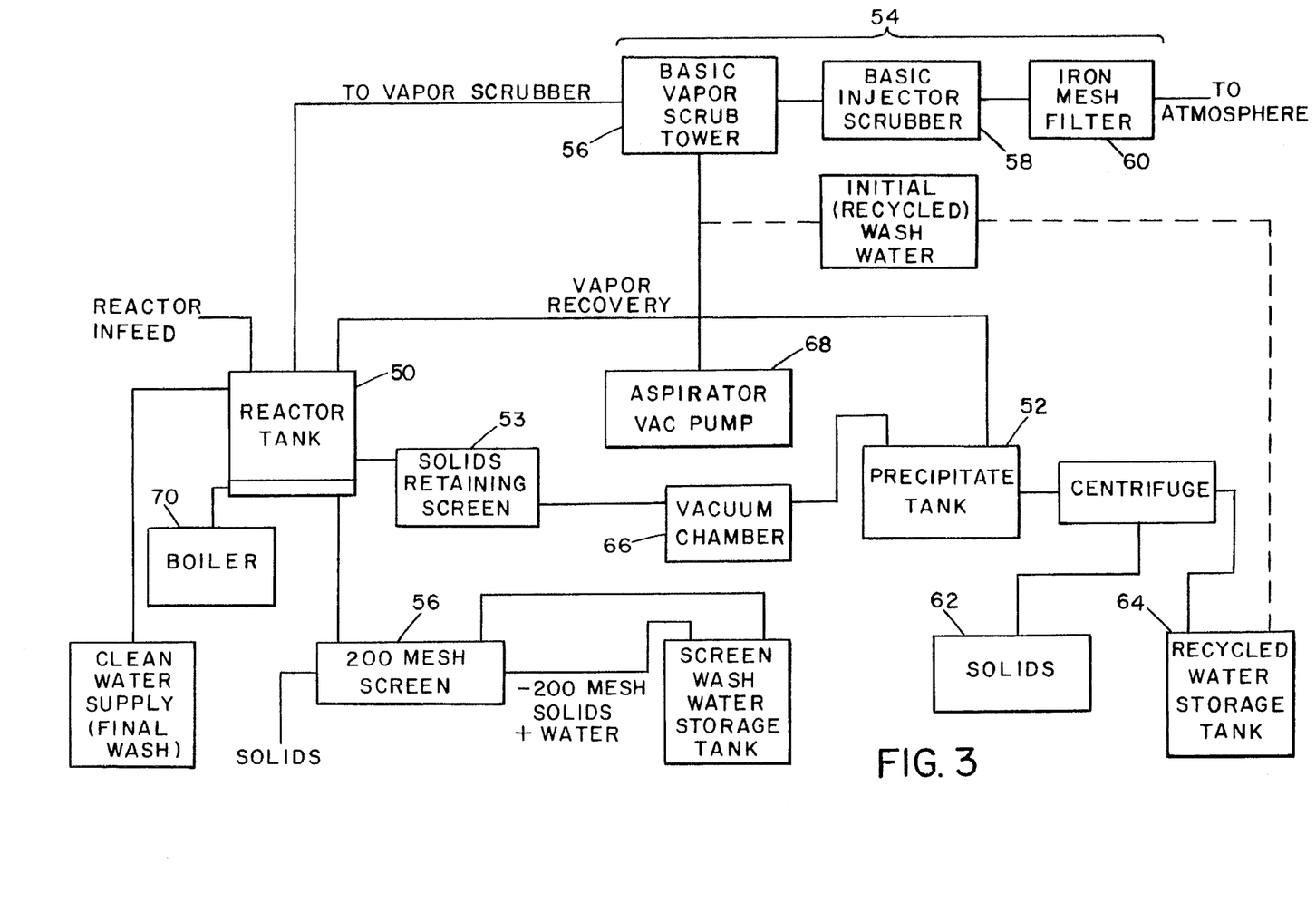
FIG. 3 is a block diagram of the chemical extraction phase of the process of the present invention.

The second phase of the inventive process involves the chemical treatment of the intermediate copper concentration material which was typically found in the −140/+200 mesh size fraction. As illustrated in FIG. 3, the equipment for performing this portion of the process has major elements of 1) a heated reactor vessel with appropriate stirring mechanisms as well as mass and chemical transfer ports, 2) a neutralization system which creates copper hydroxide solid precipitate, and 3) a vapor scrubbing system.

During initial testing, the reactor 50 was operated in a batch mode in which concentrated nitric acid from storage container 51 is added to the solids and the mixture is heated and stirred. After the appropriate reaction time, the solids are allowed to settle and the supernatant liquid is drawn off into the precipitator tank 62. The solids in the reactor vessel 50 are then washed with recycled water from the precipitate process to remove and residual copper. During the final wash, the slurried solids are dewatered with a 200 mesh screen 56, then transferred to solids recovery box 72. The remaining acid is neutralized by addition of appropriate amounts of sodium hydroxide from storage container 53. This neutralizes the washed solids at a pH of 7.5 to 8.

The reactants in the neutralizer tank 52 are neutralized with sodium hydroxide and lime. After liquid removal and drying, the solid copper hydroxide material provides a third fraction of the original sediment which is suitable for smelter recycling. Gaseous materials which evolved from the reactor during heating are piped to the scrubber section 54. Here, they pass into a spray column 56 where the nitrous oxide and carbon dioxide gases are removed. Any remaining gasses are scrubbed further by an injector system 58 using pumped sodium hydroxide solution as the drive fluid. As a further added precaution, the treated gas (air and $CO_2$) must pass an iron gauze reactor sleeve 60 prior to atmospheric discharge.

The details of the chemical extraction process system were as follows: The main reactor 50 was a 150 gallon stainless steel vessel fitted a bi-level stirrer driven by a 1 hp motor. The reactor was equipped with a steam reservoir at its bottom to provide heating capability. It also had separate ports for introducing the material to be treated, adding acid, base and bash water, and for measuring pH levels. Further, the reactor 50 contained two ports equipped with screens 53 and 56 for discharging the acidic copper leachate and a bottom discharge port for beneficiated solids. An exit port provided connection to a unit for recovering and scrubbing acid vapors.

The vacuum aspiration system consisted of a stainless steel vacuum chamber 66 attached to a venturi driven aspiration pump 68 on one side and directly connected to the two screen ports of the reactor 50 on the other side. The stainless steel vacuum chamber 66 was used to temporarily hold the acidic copper leachate prior to discharge to the neutralization tank 52.

The neutralization tank 52 was a 200 gal stainless steel sealed container equipped with a motorized stirrer and several discharge and loading ports. Three ports served to load acidic copper leachate and neutralizing base, and to discharge copper precipitate to the adjacent storage tank 20. Neutralization tank 52 also had a connection to the vapor recovery and scrubbing unit 54.

The precipitate settling tank 62 consisted of a mild steel open top vessel, approximately six feet in diameter. Tank 62 contained a single port for introducing neutralized copper precipitate, which was also used to remove the concentrated copper precipitate.

The water clarification tank 64 was of the same design as the precipitate settling tank 62 and was used as a source of wash water for the reactor.

The vapor recovery and scrubber subsystem consisted of three stages of scrubbing. The first stage 56 was made up of two enclosed polyethylene tanks set up in parallel and equipped with a reservoir of neutralizing base which was pumped through two venturis. These venturis were capable of drawing vapors from the reactor 50 and neutralization tank 52 and mixing them with the neutralizing base. An auxiliary fan was provided in line with the vapors to increase the vapor flow to the scrubber during peak emission periods. The second stage 58 consisted of an enclosed tank made of mild steel. The second stage tank was also fitted with a venturi but contained a different neutralizing buffer to act as a secondary vapor trap. The final stage consisted of a specially designed iron mesh filter 60 containing acid absorptive gauze.

The dewatering screen 56 through which the reacted solids were passed consisted of a single layer vibrating 200 mesh screen which was equipped with spray nozzles to provide a final rinse for the beneficiated sand fraction.

The acid leaching system relied on a steam boiler 70 to provide heating capacity to the main reactor 50. The boiler 70 was connected to the reactor 50 by means of a high temperature hose which led to the steam reservoir located at the bottom of the main reactor 50.

In a pilot program, 100 tons of sediments were dredged from the high copper concentration zone in the bay and placed in twelve roll-off containers. Material from each of these containers were sampled for copper content and variations were made in the mechanical and chemical processing for different batches from these containers. The initial phases of the testing involved adjustments to the system in order to accommodate the characteristics of the material. The next phase of the testing was focused on the measurement of copper concentration at the exit of each unit of operation in the process. Measurements of both mass and concentration constituted the final phases of testing. Consequently, the data allowed a mass and concentration balance to be performed on individual unit operations as well as on a global system basis. The performance of the unit operations were evaluated through a series of detailed tests on the twelve boxes of dredged material. As the data was evaluated during the course of testing, adjustments were made to the process to improve its overall performance. These included changes in the method of feeding, screen washing, cyclone arrangements and pumping.

In order to overcome the problems encountered with removing the large oversize material such as rocks, large metal portions of ships, cable, various other debris, etc., two methods of introducing the dredged material into the system were evaluated. The first method was a direct injection or forced feed into the system. Here, dredged material was scooped from the roll-off container or box with a skip loader and placed on a static screen located above a variable speed screw feeder. After the sediments in the hopper were forced through the screen, the large oversized material was removed by a separate operation. An alternative method of feeding was developing in which sediments were pre-slurried before entering the system's dilution tank, thereby bypassing the feed hopper. Although this facilitated the removal of the large objects, also through a separate operation, problems were encountered with the unentrainment of fines which are typically high copper concentration fractions. The other aspects of the system modifications were directed toward enhancing the precision of the separations. This included producing low copper concentration shell (+20 mesh) and sand (−20/+140 mesh) fractions as well as removing fines from the process water in order to improve its recyclability and complete the material recovery. Briefly, these types of changes were accomplished through adjustments in process screen flow rates and circuits, screen spray washing patterns and retention times, and the addition of multiple stages of finer diameter cyclones.

The following description of the system operation conditions and modifications is arranged according to the box being processed for Boxes 1–12. The copper concentration varied from box to box based on initial measurements taken through a grab sample. This method is typically inaccurate but can be remedied through composite sampling of as-dredged material. The operating conditions for each box follow:

Box 1
  a) Operation with one 4-inch cyclone (15) at a pressure of 25 psi and one 2-inch cyclone (32) at a pressure of 25–30 psi;
  b) 2-inch cyclone overflow going directly into Baker tank (20);
  c) Operating with feed hopper method;
  d) pump 36 fed directly into first cyclone tank (14);
  e) part of 4-inch cyclone overflow was bled into the Baker tank (20) due to lack of capacity in the 2-inch cyclone (32).

Box 2
a) same overall parameters as Box 1;
b) additional 2-inch cyclone (15) was added;
c) overflow of both 2-inch cyclones was sent to the Baker tank (20);
d) part of the overflow from the 4-inch cyclone (15) was bled back to the mix tank (4) to keep from introducing any of its overflow into the Baker tank, however, this was no longer necessary once the second 2-inch cyclone was installed;
e) the spray nozzle arrangement was changed on the first screen (10) for improved cleaning on the +20 mesh fraction.

The above modifications were performed to clean up the overflow going to the Baker tank and to remove contaminants and excess water from the +20 mesh fraction.

Box 3
a) the spray nozzle pattern on the second screen was changed to enhance the throughput through the −140 mesh screen (18);
b) diverters were installed on the second screen (18) to increase residence time and direct water away from the discharge port;
c) a new 140 mesh screen was installed;
d) the spray nozzle was adjusted to improve coverage of the second screen;
e) gas powered pump tested for slurry feed.

Changes a) through d) were made to increase screening efficiency and to remove contaminants in excess water from the +140 mesh fraction.

Box 4
a) slurry system run using gas powered pump;
b) the build up of fines was observed in the slurry box with an increased quantity of −140 and −200 material coming through;
c) a gas powered pump was used to replace pump 22 after repeated seal failures. The first cyclone pressure was 18–20 psi;
d) both the feed hopper and slurry method were run-slurry method was run until a pump seal failure occurred in pump 22, then switched over to the feed hopper;
e) four 2-inch cyclones (32A, B, C and D) were tested in parallel with all overflows going into the Baker tank. Later, part of overflow from one of the 2-inch cyclones was bled into the mix tank (4).

These changes increased material removal from the Baker tank and improved water recyclability.

Box 5
a) all four 2-inch cyclones were run in parallel as follows: overflow from the first 2-inch cyclone (A) went into the Baker tank, overflow from the second (B) was split between Baker tank and mix tank; overflow from third (C) and fourth (D) 2-inch cyclones went into second cyclone tank (B). This change was made to increase water recycling and to decrease solids in the Baker tank;
b) a new trash pump was run as pump 12 to feed the 4-inch cyclone (15) at a pressure of 25 psi. After seal failure, switched back to gas powered pump at 18 psi;
c) the overflow from the classifier was pumped into the 2-inch cyclone tank. (Previously this overflow went into the 4-inch cyclone tank or the mix tank. This change was made to remove high copper fraction from classifier overflow by putting it into the 2-inch cyclone and to prevent contamination of sands (+140 mesh) fraction by recycling classifier overflow through the second screen;
d) due to the change in pumping of the classifier overflow, the overflows of the 2-inch cyclones were changed from a) by pumping the overflow from the fourth 2-inch cyclone into the Baker tank;
e) note that a portion of the classifier overflow went into the 4-inch cyclone or the mix tank before the changeover in c) occurred.

Box 6
a) ran same conditions as box 5 after the change in classifier overflow;
b) gas powered pump for the first cyclone was still run at 18 psi.

Box 7
a) 2-inch cyclones were run in series as follows: overflows from third (C) and fourth (D) 2-inch cyclones were pumped to the 1-inch cyclone at 35 psi and the overflows from the first (A) and second (B) 2-inch cyclones were pumped back to the Baker tank at 30 psi pressure;
b) the overflow from the first cyclone (4-inch) was split between the mix tank and 2-inch cyclone tank due to its flow exceeding capacity for only two cyclones.
c) observed a very high sand and fines content in this box with almost no shells;
d) cyclones were modified as follows: first cyclone (4-inch) operated at 15 psi, first and second 2-inch cyclones (A and B) at 25 psi, and third and fourth 2-inch cyclones (C and D) are 25–30 psi;
e) Box 7 was finished and began running material left in slurry box from previous runs. Baker tank water fouled due to tank level exceeding curtain height inside tank. Installed higher curtains.

The changes in a) and b) were made to remove more material from the stream going into the Baker tank and to maximize the water recycling within the system.

Box 8
a) began the mass balance measurement;
b) installed 1-inch cyclones (third cyclone) with five in parallel, with all cyclones arranged as follows: first cyclone (4-inch) overflows were split to the mix tank and 2-inch cyclone tank, third and fourth 2-inch cyclone (C and D) overflows were pumped to the 1-inch cyclone tank with a feed to the first and second 2-inch cyclones (A and B). The half of the overflows of the first (A) and second (B) 2-inch cyclones were fed to each of the five 1-inch cyclones with the other half to the Baker tank due to limited 1-inch cyclone capacity. Classifier overflow was pumped to the 2-inch cyclone tank. These changes were made to remove more solids from the stream going into the Baker tank.
c) a Carver pump was installed for carrying overflow from the 2-inch cyclones to the Baker tank;
d) installed a 7.5 hp cyclone pump to increase flow of 1-inch cyclones from 25 psi to 35 psi. Cyclone pressures are now: 4-inch: 30 psi, 2-inch: 30 psi, 1-inch: 35 psi;
e) 1-inch cyclone apexes were not restricted for a first run;
f) 1-inch cyclone apexes were restricted to about $5/32''$ for a second run;
g) ten 1-inch cyclones were run in parallel with all apexes restricted to $5/32''$ for a third run;

h) ten 1-inch cyclones were run in parallel with unrestricted apexes for a fourth run;

i) Baker tank water fouled during fourth run due to low level in tank;

j) during the fourth run the cyclones were arranged as follows: overflow of 4-inch cyclone to mix tank and 2-inch cyclone tank, overflow of third (C) and fourth (D) 2-inch cyclone to 1-inch cyclone tank feed to all 10 1-inch cyclones, first (A) and second (B) 2-inch cyclones were unintentionally put into a closed circuit, overflow of 1-inch cyclones to the Baker tank and classifier overflows into 2-inch cyclone tank. This and the preceding steps were performed to remove additional solids from the stream to the Baker tank.

k) with first (A) and second (B) 2-inch cyclones in a closed loop there was a noticeable increase in solids in the 1-inch cyclone unders.

Box 9 a) conducted mass balance measurements;

b) implemented composite sampling procedure;

c) operations with clean Baker tank;

d) cyclone pressures are now as follows: 4-inch cyclone: 28–30 psi, 2-inch cyclones: 30 psi, 1-inch cyclones: 30 psi.

Box 10 a) operated with same conditions as Box 9;

b) conducted mass balance measurements.

Box 11 a) first (A) and second (B) 2-inch cyclones placed back in loop with overflows from third (C) and fourth (D) 2-inch cyclones running into the first and second 2-inch cyclones and overflows of first (A) and second (B) 2-inch cyclones running into the 10 1-inch cyclones. This returned the system to its optimal configuration.

b) all pressures remain the same;

c) one set of samples was taken before first (A) and second (B) 2-inch cyclones were place back in loop. Remaining samples were taken after modification;

d) conducted mass balance measurements.

Box 12 a) same operating conditions as Box 11;

b) conducted mass balance measurements.

During the course of evaluating the processing system unit operations a special subset of cyclone performance testing was conducted. Basically, this series of testing was designed to deal with the issue of reducing the fine particulate material which was being carried over in the initial phases of processing. In the system under test, this material eventually settled in the Baker tank and posed a major obstacle for obtaining optimal recyclability of the process water. A test protocol was developed which systematically evaluated the cyclone size, circuit configuration, capacity and copper concentration in the under and over fractions. The following is a brief description of the four tests which were performed.

Test 1

Figure 4:
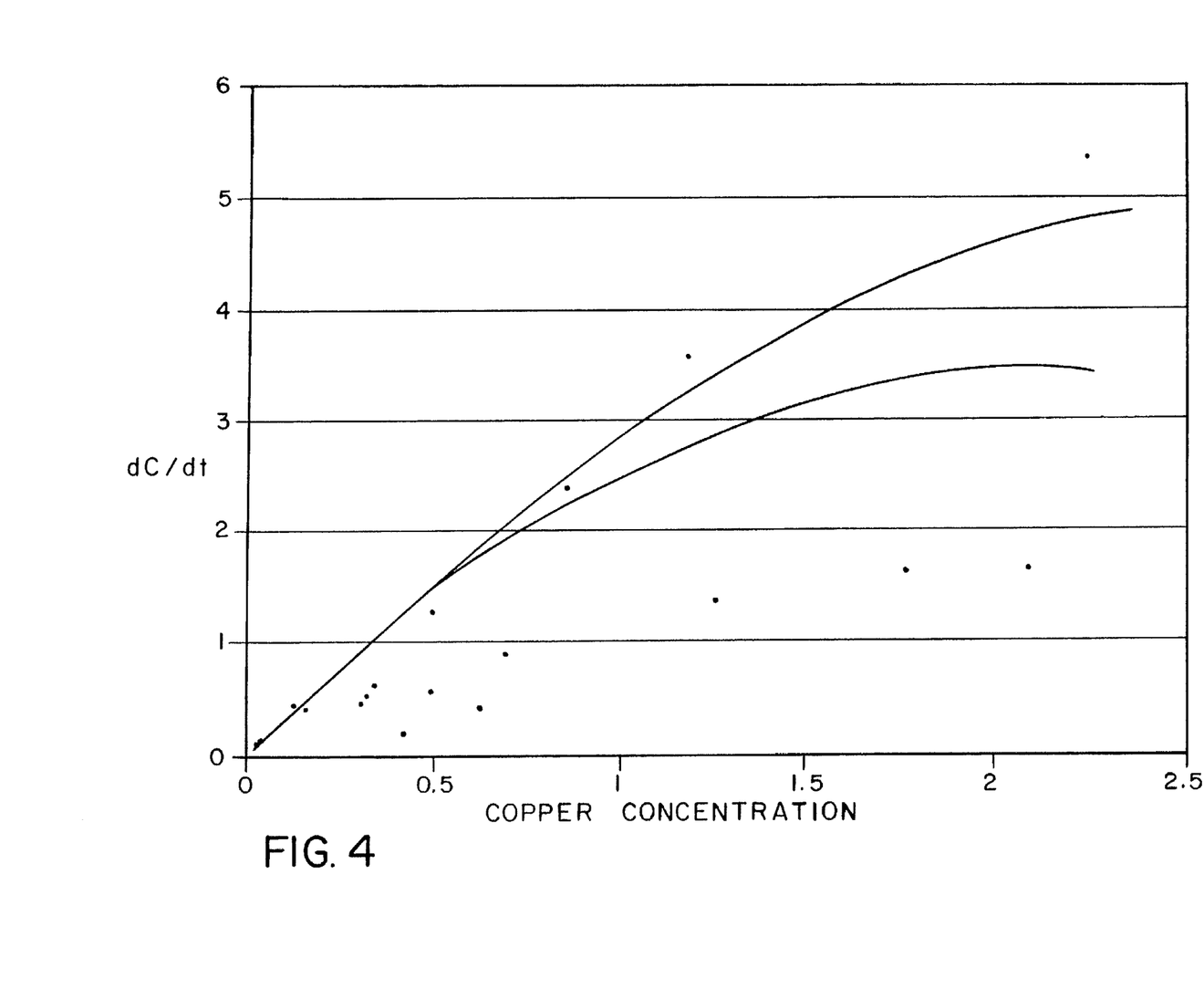
FIG. 4 is a plot of the change in copper concentration with time for the chemical extraction phase of the inventive process.

The first series of tests was implemented to evaluate the concept of including additional 2-inch cyclones in the water recycling loop in order to improve removal of copper fines. As shown in FIG. 4a, the test involved the continuous removal of fines, i.e., cyclone unders and the recirculation of the overs fraction. Basically, the cyclone was operated in a closed loop with an initial 5% solids concentration. The continuous removal of particles (unders) allowed a lower solids content stream to be reintroduced into the cyclone. Time dependent sampling of the overs showed a progressive drop in copper concentration as indicated in Table 1.

TABLE 1

| Time (min) | Cu Concentration (mg/kg) | | |
|---|---|---|---|
| | Feed | Overs | Unders |
| 0 | 10,200 | | |
| 5 | | 14,200 | 7,700 |
| 35 | | 7,000 | 5,900 |
| 45 | | 8,200 | 5,900 |

After a certain period, the particular size fraction removed by the cyclone will have been eliminated from the loop and no further decreases in concentration will occur. As a result of these tests, two 2-inch cyclones were added to the original configuration.

Test 2

The next series of cyclone tests, the steps of which are shown in FIG. 4b, were designed to evaluate the capability of removing finer particle material from the recycled water loop. Here, a set of five 1-inch cyclones was included so that the 2-inch cyclone overs stream then proceeded into the 1-inch cyclones for further removal of finer particles. As indicated in Table 2, the data shows a continual drop in copper concentration in the overs stream and an elevated concentration in the unders stream.

TABLE 2

| Test Point | Cu Concentration (mg/kg) |
|---|---|
| 4-inch cyclone overs | 15,600 |
| 2-inch cyclone C & D overs | 8,900 |
| 2-inch cyclone A & B overs | 10,300 |
| 2-inch cyclone A & B unders | 26,700 |
| 1-inch cyclone A–E overs | 7,700 |
| 1-inch cyclone A–E unders | 13,800 |

Tests 3 and 4

This series of tests was designed to optimize the performance of the 1-inch cyclones. In order to accommodate the flow rate of the entire loop a total of 10 1-inch cyclones was required. During test 3 these cyclones were operated in an unrestricted mode. Changes in the diameter of the apex and vortex consistent with the design flow rate capacity of the cyclone were evaluated during test 4. The results of these tests is shown in Table 3.

TABLE 3

| Test Point | Cu Concentration (mg/kg) |
|---|---|
| Test 3 | |
| 2-inch cyclones A & B overs | 7,200 |
| 1-inch cyclones, restricted orifice: | |
| overs | 6,800 |
| unders | 13,300 |
| Test 4 | |
| 2-inch cyclones A & B overs | 9,400 |
| 1-inch cyclones, unrestricted orifice: | |
| overs | 6,400 |
| unders | 12,200 |

The data collection during the first portion of the test was principally concerned with an evaluation of the copper concentration following each operation. Thus, during this phase, appropriate adjustments in the system's operating parameters were made in order to produce the desired concentrations. After the system was adjusted, the final sequence of testing included mass balance measurements so that both the percent solids and concentration could be evaluated after each unit operation. A set of portable scales was used to weigh the gross and tare weight of each container. As the material was being processed, samples at each unit operation were collected at 1-hour intervals and composited on a daily basis. These samples were then used to yield the copper concentration and percent solids on a dry basis. A separate weighing procedure was developed for obtaining the quantity of gross oversize material which was stockpiled during the processing of boxes 1–11. After this material was weighed, an average weight was then assigned for this fraction on a per box basis. During the processing of box 12, the gross oversize material was collected and weighed separately.

A separate testing and evaluation protocol was developed for the chemical extraction portion of the process. Basically, the chemistry of the process involves the reaction of chalcopyrite with nitric acid to form copper nitrate, i.e., $$CuFeS_2 + 4HNO_3 \rightarrow Cu(NO_3)_2 + Fe(NO_3)_2.$$

It is important to note that the above reaction takes place in a sand matrix which can inhibit the transport processes governing 1) the ability of $HNO_3$ to wet the surface of the $CuFeS_2$ particles, 2) the diffusive and convective transport of $Cu(NO_3)_2$ away from the reaction, and 3) the absorption of thermal energy from the reaction. From the view of operations, the entire reaction kinetics process is considered in terms of 1) obtaining the proper acid-to-solid ratio in order to ensure sufficient wetting in transport for variable copper concentration in-feed, 2) allowing sufficient time for the reaction to reach completion thereby yielding a clean sand substitute, and 3) maintaining the reaction at the proper temperature. In terms of process design, these factors translate to a vessel configuration which will yield the desired throughput. Thus, the resolution of these issues provided the rationale for the reactor test protocol and subsequent analysis.

During the initial testing, sufficient quantities of −140/+200 mesh material were generated for testing. A series of 12 batch tests were performed utilizing approximately 3 tons of material. Samples were removed from the reactor to establish the process kinetics and sufficient information was collected to optimize the principal process parameters of loading, chemical reagent additions, and process time. An evaluation of the vapor scrubbing system established the gas flow rate and composition. As the project proceeded, appropriate adjustments and modifications in terms of loading, stirring, heating and precipitating were made to this portion of the process with the goals of final optimization.

The typical extraction test protocol started with the loading of a weighed amount of copper-containing solids from the −140/+200 screen of the physical treatment process. After all the solids were loaded into the reactor, an initial solids sample, consisting of moist solids. was taken. The reactor stirrer was started and approximately 10% w/w (based on wet solids) water was added. The reactor was then sealed and approximately eighty gallons of nitric acid per 100 lbs. of copper-containing solids was added over a period of 15 minutes. On the completion of the acid addition, a second sample, consisting of solids, water and acid, was taken. The reaction was allowed to proceed for 30 minutes using the exotherm produced by the reaction. After this 30 minute induction period, a third sample was taken to determine the extent of the reaction. At this point the steam reservoir was charged with steam to maintain the reaction temperature at approximately 200°–210° F. (93°–99° C.) for the duration of the reaction. After an additional 30 minutes, a fourth sample was taken to determine the progress of the reaction. The reaction was allowed to continue for an additional 90 minute period during which samples to chart the progress of the reaction were taken at 30 minute intervals.

After the reaction had continued for two and one-half hours, the steam port was closed, the vacuum aspiration subsystem was charged and the screened port leading to the vacuum aspiration subsystem was opened. The acidic copper solution was filtered through the screens and, after a brief interval in the aspiration tank, was pumped to the neutralization tank.

The solids in the reactor were washed with three separate portions of recycled water at proportions of 10–12 gallons per 100 lbs. of solids and the resulting wash water was again filtered through the screened ports into the aspiration chamber prior to being pumped to the neutralization tank. A final rinse of fresh water was introduced into the reactor and neutralized to a pH level of 7.5–8. The neutralized solids suspension was then discharged through the bottom port of the reactor and dewatered by pumping them over the 200 mesh screen. A sample of these solids was taken and the entire amount of solids was weighed.

The acid-copper solution residing in the neutralization tank was neutralized with caustic soda to a pH level of 7.5–8 and allowed to stir for 15–20 minutes. After this neutralization step, the now-precipitated copper was pumped into the settling tank where it was allowed to stand quiescently for several hours. After four hours, the copper precipitate had settled sufficiently to allow supernatant water to be drawn off and transferred to the water clarification tank. The concentrated precipitate was transferred to drying beds prior to being placed in storage drum for shipment to the smelter.

During the reaction stage and the neutralization stage, the vapor recovery and scrubber subsystem was in operation continuously to trap and neutralize acid gas generated during these procedures. The pH of the scrubber buffer was monitored throughout the extraction and subsequent neutralization and was replenished as soon as it reached a present pH level. The following twelve reactions were tested:

Reaction 1

Approximately 240 lbs. of wet −140/+200 mesh fraction was added to the reactor followed by the addition of 5 gal. of water. This mixture was stirred and heated to about 100° F. Five gallons of 70% nitric acid were added to the reactor. After the addition of the nitric acid, a fairly vigorous reaction was noted (rapid exotherm to 145° F.). The reaction was continued for 90 minutes during which the temperature rose to 150° F. After 90 minutes, the reddish-brown gaseous reaction byproduct reduced in intensity and the reaction was considered completed. An additional 5 gallons of water was added to the reactor and the reaction was allowed to cool to room temperature. At room temperature, the solution of acid, water and copper was removed from the reactor and the remaining solids were washed twice with 20 gallon portions of water. These wash fractions were combined with the copper-laden acid solution in the neutralization tank and neutralized and pumped over the dewatering screen, air dried and stored.

Reaction 2

In this test, 160 lbs. of copper containing −140/+200 mesh fraction of sediment was added to the reactor. No additional water was added beyond that which was already adhering to the solids. Three 1.7 gallon portions of nitric acid were added over a period of two and one-half hours. After the first addition of acid, the temperature was slowly increased to 100° F. and the temperature was maintained at 140° to 150° for the remaining reaction period. At the conclusion of the reaction, the copper solution was removed from the reaction vessel as described in the previous test. The extracted solids were removed, dried and returned to the reactor for a second extraction attempt.

Reaction 3

The dried solids from reaction 2 were mixed with three successive 1.6 gallon portions of nitric acid over the period of about two hours. During this test, steam was directly introduced into the mixture to maintain reaction temperature. The copper solution was drained and the extracted solids were removed from the reactor vessel as described under reaction 1.

Reaction 4

Wet solids weighing 181 lbs. with approximately 14% by weight moisture were added to the reactor. The reactor was sealed and 8.6 gallons of nitric acid were added. A vigorous reaction ensued as evidenced by the strong evolution of gas and a rapid exotherm. The reaction was allowed to continue for 30 minutes without the addition of external heat. After 30 minutes the reaction temperature was gradually raised to 180° F. These conditions were maintained for 45 additional minutes after which an additional 1.7 gallons of nitric acid was pumped into the reactor and heating was maintained for another 90 minutes. The reaction was then quenched and the reaction products and the extracted solids were removed from the reactor as described under reaction 1.

Reaction 5

During this test, 180 lbs. of copper-containing sand fraction were added to the reactor. This fraction contained approximately 23,100 mg/kg copper. 8.5 gallons of nitric acid were pumped into the reactor and the reaction was allowed to proceed for the first 30 minutes without external heating. Two sources of heat were supplied in this reaction. One source was steam applied externally to the base of the reactor at the steam reservoir and the other was steam which was directly injected into the reactor so that it mixed with the reactants. The reaction was allowed to continue under these conditions for 180 minutes. The resulting products were removed from the reactor and separated into their component fractions in the usual manner.

Reaction 6

The sixth reactor test involved the addition of 180 lbs. of copper contaminated sand fraction. The copper level in this fraction was approximately 19,800 mg/kg. Eight gallons of nitric acid were added and allowed to react for 10 minutes. Three additional gallons of acid were added and the reaction was heated with steam to approximately 200° F. After 90 minutes, an additional 1.6 gallons of acid was added and the reaction was continued for 140 minutes. The reaction was quenched with water and the reaction products removed as before.

Reaction 6A

The run was started with 255 lbs. of solids and 20 gallons of nitric acid. However, during this particular test the reaction proceeded in a manner which temporarily overwhelmed the scrubbing system. Consequently, the reaction was quenched and no data was collected. Following this vapor release, the scrubbing system was redesigned and rebuilt to take into account the peak level of vapor generation which would occur during subsequent tests.

Reaction 7

This test was conducted with 250 lbs. of sediment fraction having a copper concentration of 19,800 mg/kg. The sample contained a small fraction of lime that had been inadvertently added to the reactor. Acid was added to the reactor in three portions of 8.5 gallons, 5.1 gallons and 5.1 gallons, respectively, during the first 30 minutes of the reaction. The lime served to increase the initial exotherm and appeared to facilitate extraction and subsequent copper recovery. The reaction was allowed to proceed for an additional 180 minutes before being quenched and the products were removed as previously described.

Reaction 8

For this test, 250 lbs. of screen sediment were added to the reactor followed by one 8.5 gallon portion of nitric acid. After a 10 minute interval an additional 5.1 gallons of acid were added and, 10 minutes later, an additional 5.1 gallons were pumped into the reactor. The reaction mixture was then heated externally with steam and the reaction was allowed to proceed for 120 minutes. After the reaction, the product was prepared for removal from the reactor by neutralizing the various fractions. The cleaned copper-free fraction was stored. During this test, a time-dependent volumetric measurement was made of the vapor generation that corresponded with specific reactant conditions.

Reaction 9

150 lbs. of dry sediment fraction were introduced into the reactor and suffused with a mixture of nitric acid and water. The reactor was heated to 200° to 210° F. and the reaction proceeded for 150 minutes before being quenched and the products removed for disposition. During the course of this reaction, a detailed evaluation was made of the gas production, the level of exotherm as related to specific quantities of sediment and acid, and the amount of external heat added to facilitate the reaction progress.

Reactions 10 and 11

Reaction 9 was repeated using 190 lbs. of dry sediment fraction. The water portion of the reaction was added separately to the uncharged reactor. Further, the amount of acid added was prorated to take into account the difference in reactor solids.

Reaction 12

The conditions for this test involved 250 lbs. of sediment fraction, 6 gallons of water, and 10 gallons of nitric acid. The reaction was allowed to proceed under its own exotherm for the first 30 minutes. Steam was then used to bring the mixture temperature to 200° F. The test was continued for 150 minutes before the reaction was stopped and the products removed from the reactor as described above.

Table 4 provides the results of the 12 reactions:

TABLE 4

| Reaction No. | Time (min) | Temp (°F.) | Cu Concentration (mg/kg) | Total Cu mg |
|---|---|---|---|---|
| 1 | 0 | 0 | 7,061 | $7.7 \times 10^5$ |
|  | 90 | 100 | 6,114 | $6.7 \times 10^5$ |
| 2 | 0 | 0 | 16,875 | $1.2 \times 10^6$ |
|  | 150 | 100 | 6,973 | $5.1 \times 10^5$ |
| 3 | 0 | 0 | 9,037 | $6.6 \times 10^5$ |
|  | 120 | 150 | 848 | $6.2 \times 10^4$ |
| 4 | 0 | 0 | 30,588 | $2.5 \times 10^6$ |
|  | 43 | 100 | 11,200 | $9.2 \times 10^5$ |
|  | 90 | 100 | 13,000 | $1.1 \times 10^6$ |
|  | 150 | 100 | 11,500 | $9.5 \times 10^5$ |
|  | 190 | 100 | 12,200 | $1.0 \times 10^6$ |

TABLE 4-continued

| Reaction No. | Time (min) | Temp (°F.) | Cu Concentration (mg/kg) | Total Cu mg |
|---|---|---|---|---|
|  | 210 | 0 | 8,600 | $7.1 \times 10^5$ |
| 5 | 0 | 0 | 23,100 | $1.9 \times 10^6$ |
|  | 29 | 100 | — | — |
|  | 54 | 100 | 18,400 | $1.5 \times 10^6$ |
|  | 119 | 100 | 5,100 | $4.2 \times 10^5$ |
|  | 180 | 100 | 1,900 | $1.5 \times 10^5$ |
| 6 | 0 | 0 | 19,800 | $1.6 \times 10^6$ |
|  | 58 | 200 | 15,960 | $1.3 \times 10^6$ |
|  | 126 | 200 | 1,398 | $1.1 \times 10^5$ |
|  | 165 | 200 | 115 | $9.4 \times 10^3$ |
|  | 240 | 200 | 44 | $3.6 \times 10^3$ |
| 7 | 0 | 0 | 19,800 | $2.09 \times 10^6$ |
|  | 105 | 200 | 3,181 | $3.4 \times 10^5$ |
|  | 159 | 200 | 0 | 0 |
| 8 | 0 | 0 | 20,100 | $2.23 \times 10^6$ |
|  | 30 | 200 | 5,600 | $6.2 \times 10^5$ |
|  | 60 | 200 | 4,400 | $4.9 \times 10^5$ |
|  | 90 | 200 | 1,000 | $1.1 \times 10^5$ |
| 9 | 0 | 0 | 25,800 | $1.76 \times 10^6$ |
|  | 36 | 200 | 17,300 | $1.17 \times 10^6$ |
|  | 60 | 200 | 4,500 | $3.1 \times 10^5$ |
|  | 90 | 200 | 2,500 | $1.7 \times 10^5$ |
|  | 120 | 200 | 700 | $5.0 \times 10^4$ |
|  | 150 | 200 | 200 | $1.0 \times 10^4$ |
| 10 | 0 | 0 | 8,000 | $6.9 \times 10^5$ |
|  | 30 | 200 | 4,900 | $4.2 \times 10^5$ |
|  | 60 | 200 | 4,200 | $3.6 \times 10^5$ |
|  | 90 | 200 | 500 | $4.0 \times 10^4$ |
|  | 120 | 200 | 100 | $9.0 \times 10^3$ |
| 11 | 0 | 0 | 14,400 | $1.26 \times 10^6$ |
|  | 30 | 200 | 9,700 | $8.5 \times 10^5$ |
|  | 60 | 200 | 1,500 | $1.3 \times 10^5$ |
|  | 90 | 200 | 0 | 0 |
|  | 120 | 200 | 0 | 0 |
| 12 | 0 | 0 | 5,400 | $4.9 \times 10^5$ |
|  | 30 | 200 | 3,500 | $3.2 \times 10^5$ |
|  | 60 | 200 | 1,800 | $1.6 \times 10^5$ |
|  | 90 | 200 | 400 | $4.0 \times 10^4$ |
|  | 120 | 200 | 100 | $9.0 \times 10^3$ |

The analyses are in terms of total copper, thereby including the effect of mass. For this process, a reaction rate constant (m) can be obtained by considering the relationship between the rate of change in concentration (dC/dt) and concentration (C). Thus, for first order kinetics, $$dC/dt = mC \quad (1)$$

or after arrangement and integration, $$\int 1/C\,dC = \int m\,dt \quad (2)$$

$$\log C = mt \text{ and } C = e^{mt}. \quad (3)$$

The data provided in Table 4 can be used to obtain values for dC/dt. A value for (m) can then be obtained from the slope of the dC/dt versus C relationship shown in FIG. 4. A value for (m) was found to be $1.567 \times 10^2$/min, so that $C = e^{157t}$, where t is the time in minutes and C represents that concentration consistent with approximately 95% of the copper in the in-feed material being converted to $Cu(NO_3)_2$.

In order to verify the above hypothesis, a further analysis was performed to evaluate the order of the reaction (n). A set of reaction constants ($R_1$ to $R_4$ or dC/dt at particular intervals) were obtained from the data of Table 4. The following expressions were used to obtain a value for (n):

$$\text{Rate}_1 = R_1 = k(C_1)^n \text{ and } \text{Rate}_2 = R_2 = k(C_2)^n, \quad (4)$$

so, $\quad n = \dfrac{\log (R_1/R_2)}{\log (C_1/C_2)}$ .

For the period $R_1$ to $R_2$, the value of n is 0.966, consistent with the first order kinetic model. As the reaction proceeds to $R_3$, the value of n becomes 0.33. Consequently, these results are consistent with the empirical observations which showed that the reaction was essentially completed after one hour.

The inventive process provides a means for mitigating the contamination in the sediment through a maximization of recycling. The ability to recycle the metal ore can result in additional economic advantages, since the ore can be sold to recover at least a portion of the costs of the clean-up effort. While described in terms of a copper extraction process, the inventive process can be adapted for use in extracting a number of different metals by selecting screen sizes appropriate to the smallest size of the metal ore, and selecting acids and other reagents for placing the metal into solution for formation of metal ore precipitates. The number of individual components of the process system can be adjusted as needed to handle the volume of material to be processed.

It will be evident that there are additional embodiments which are not illustrated above but which are clearly within the scope and spirit of the present invention. The above description and drawings are therefore intended to be exemplary only and the scope of the scope of the invention is to be limited only by the appended claims.

I claim:

1. A process for extracting and reclaiming metallic contamination from sediment comprising the steps of:

removing large oversize articles from the sediment;

diluting the sediment with water;

passing the sediment through a first screen to remove small oversize debris;

passing the sediment through a first hydrocyclone for dewatering said sediment to produce a first overs fraction comprising removed water from the sediment and a first unders fraction;

passing the first unders fraction through a plurality of second screens for separating said first unders fraction into a sand fraction, a fine fraction, and a mid-size fraction wherein said sand fraction has a low metal concentration, said fine fraction has a high metal concentration and said mid-size fraction contains a sufficient metal concentration to make it unsuitable for return to an environment;

dewatering the fine fraction to produce a first fraction of high metal content solids, retaining the removed water from the fine fraction for further processing;

transferring the removed water from the fine fraction and the first overs fraction to at least one second hydrocyclone having a smaller diameter than that of said first hydrocyclone, said at least one second hydrocyclone generating a second overs fraction comprising clarified water for recycling and a second unders fraction;

placing the second unders fraction in a settling tank wherein a second fraction of high metal content solids are settled;

extracting clarified water from said settling tank for recycling;

transferring the mid-size fraction to a chemical reactor;

reacting the mid-size fraction with a chemical reagent within said reactor whereby said metal within the mid-size fraction is placed in a solution;

passing the solution through a third screen to extract a solids suspension;

neutralizing the chemical reagent and its byproducts in the solids suspension and the solution;

precipitating said metal in said solution into a third fraction of high metal content solids; and drying all fractions of high metal content solids for recycling.

2. A process for extracting and reclaiming as in claim 1 wherein said first screen has a size 20 mesh.

3. A process for extracting and reclaiming as in claim 1 wherein said plurality of second screens comprises a 140 mesh screen and a 200 mesh screen.

4. A process for extracting and reclaiming as in claim 1 wherein said at least one second hydrocyclone comprises two groups of hydrocyclones, a first group of hydrocyclones having a diameter larger than a second group, wherein an overs fraction from the first group of hydrocyclones is fed into the second group of hydrocyclones and the overs fraction from the second group is the second overs fraction.

5. A process for extracting and reclaiming as in claim 1 wherein the step of dewatering the fine fraction comprises pumping the fine fraction to a screw classifier.

6. A process for extracting and reclaiming as in claim 1 wherein the step of reacting said metal within the mid-size fraction includes heating said reactor and stirring a mixture of the chemical reagent and the mid-size fraction.

7. A process for extracting and reclaiming as in claim 1 wherein the step of neutralizing includes adding a basic reagent to said reactor.

8. A process for extracting and reclaiming as in claim 7 wherein the basic reagent is sodium hydroxide.

9. A process for extracting and reclaiming as in claim 1 wherein the step of neutralizing includes scrubbing vapors generated during the reacting step.

10. A process for extracting and reclaiming as in claim 1 wherein said metal is copper and the chemical reagent is nitric acid.

11. A method for extracting concentrated metal from sediment for reclamation of the metal, the process comprising the steps of:

separating debris from the sediment;

diluting the sediment with water;

separating the diluted sediment into a plurality of solid fractions and extracted water, the plurality of solid fractions comprising a sand fraction, a mid-size fraction and a first portion of fine fraction;

drying the fine fraction to form metal ore for reclamation;

processing the extract water through a plurality of hydrocyclones to separate a second portion of fine fraction from the extracted water;

drying the second portion of fine fraction to form metal ore for reclamation;

combining the mid-size fraction with a chemical reagent to place the metal in a solution;

precipitating out a third portion of fine fraction from the solution;

separating the third portion of fine fraction from the chemical reagent; and drying the third porion of fine fraction to form metal ore for reclamation.

12. A method as in claim 11 wherein a step of separating the diluted sediment comprises the steps of:

passing the diluted sediment through a first hydrocyclone to dewater the diluted sediment; and passing the dewatered sediment through at least two screens.

13. A method as in claim 11 wherein the step of drying the fine fraction includes dewatering the first portion of fine fraction using a screw classifier.

14. A method as in claim 11 wherein the set of processing the extracted water comprises of passing the extracted water through first hydrocyclone having a first diameter and a second hydrocyclone having a second diameter smaller than the first diameter.

15. A method as in claim 11 further comprising a step of separating small debris prior to separating the diluted sediment.

16. A method as in claim 15 wherein the step of separating small debris comprises passing the diluted sediment through a 20 mesh size screen.

17. A method as in claim 11 wherein the step of separating the diluted sediment comprises passing the diluted sediment through a 140 mesh size screen and a 200 mesh size screen.

18. A method as in claim 11 wherein the step of combining the mid-size fraction comprises:

loading the mid-size fraction into a reactor vessel;

adding acid to the reactor vessel;

heating the reactor vessel; and stirring the mid-size fraction and acid within the reactor vessel.

19. A method as in claim 18 wherein the step of separating the third portion of fine fraction includes neutralizing the acid with caustic soda.

* * * * *